United States Patent
Schoellhorn et al.

(10) Patent No.: US 7,431,051 B2
(45) Date of Patent: *Oct. 7, 2008

(54) SEWAGE SYSTEM FOR VEHICLES

(75) Inventors: Robert A. Schoellhorn, Coburg, OR (US); Mark A Bryan, Eugene, OR (US); Alan B. Christianson, Eugene, OR (US); Gerald R Lacey, Springfield, OR (US)

(73) Assignee: Marathon Coach, Inc., Coburg, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/641,458

(22) Filed: Aug. 14, 2003

(65) Prior Publication Data

US 2004/0031528 A1 Feb. 19, 2004

Related U.S. Application Data

(63) Continuation of application No. 09/881,293, filed on Jun. 13, 2001, now Pat. No. 6,607,009.

(51) Int. Cl.
*F15B 9/00* (2006.01)
*F03C 1/12* (2006.01)
*F16D 27/12* (2006.01)
*F16L 3/00* (2006.01)

(52) U.S. Cl. ............. 137/899; 137/355.12; 137/355.16; 4/323; 92/34

(58) Field of Classification Search ............ 137/899, 137/355.12, 355.16; 4/323; 92/34; 222/526, 222/535, 492, 493
See application file for complete search history.

(56) References Cited

U.S. PATENT DOCUMENTS

| | | | | |
|---|---|---|---|---|
| 3,190,505 A | * | 6/1965 | Arbitman et al. | 222/207 |
| 3,704,760 A | * | 12/1972 | Maruyama | 180/65.2 |
| 3,811,462 A | * | 5/1974 | Feliz | 137/240 |
| 3,815,787 A | * | 6/1974 | Spies | 222/95 |
| 4,133,347 A | | 1/1979 | Mercer | |
| 4,223,702 A | | 9/1980 | Cook | |
| 4,779,650 A | | 10/1988 | Sargent | |
| 4,854,349 A | | 8/1989 | Foreman | |
| 5,023,959 A | * | 6/1991 | Mercer | 4/321 |
| 5,078,180 A | * | 1/1992 | Collins | 137/899 |
| 5,244,003 A | | 9/1993 | Boomgaarden | |
| 5,247,974 A | | 9/1993 | Sargent | |
| 5,636,648 A | | 6/1997 | O'Brien | |
| 5,653,262 A | | 8/1997 | Hanemaayer | |
| 5,697,285 A | * | 12/1997 | Nappi et al. | 91/519 |
| 5,816,639 A | | 10/1998 | DiBiagio | |
| 5,823,869 A | | 10/1998 | Paturzo | |
| 5,904,183 A | | 5/1999 | Leech | |
| 5,951,082 A | | 9/1999 | DiBiagio | |

(Continued)

OTHER PUBLICATIONS

Marathon Coach, Inc. v. Phase Four Industries, Inc., et al.: Complaint for Patent Infringement; Nov. 19, 2004.

(Continued)

*Primary Examiner*—John Rivell
*Assistant Examiner*—Cloud K Lee
(74) *Attorney, Agent, or Firm*—Chernoff, Vilhauer, McClung & Stenzel

(57) ABSTRACT

A sewage system for vehicles that includes a waste hose that is extendable and retractable.

5 Claims, 2 Drawing Sheets

U.S. PATENT DOCUMENTS

| | | | | | |
|---|---|---|---|---|---|
| 5,988,221 | A | * | 11/1999 | Walker | 137/899 |
| 6,623,205 | B1 | * | 9/2003 | Ramirez | 404/6 |
| 6,685,162 | B2 | * | 2/2004 | Carpenter | 251/150 |

OTHER PUBLICATIONS

Phase Four Industries, Inc. v. Marathon Coach, Inc.: Complaint for Declaratory Judgment w/ attached Exhibits 1-3; Nov. 12, 2004.

Phase Four Industries, Inc. v. Marathon Coach, Inc.: Defendant's Answer and Counterclaim; Dec. 3, 2004.

Phase Four Industries, Inc. v. Marathon Coach, Inc.: Defendant's Answer and Counterclaim w/ attached Exhibit A; Dec. 10, 2004.

Phase Four Industries, Inc. v. Marathon Coach, Inc.: Pl. Phase Four Industries, Inc.'s Reply to the Counterclaim of Defendant Marathon Coach, Inc.; Dec. 22, 2004.

Phase Four Industries, Inc. v. Marathon Coach, Inc.: Pl. Phase Four Industries Inc.'s Reply to the Counterclaim of Defendant Marathon Coach, Inc.; Dec. 23, 2004.

Phase Four Industries, Inc. v. Marathon Coach, Inc.: Def. Marathon Coach, Inc.'s Motion for Partial Summary Judgment of Validity w/ 4 attached Declarations; Mar. 28, 2005.

Phase Four v. Marathon: (Pl's) Memo. of Points & Authorities in Support of Motion for Partial Summary Judgment w/ 4 attached Declarations; Mar. 29, 2005.

Phase Four Industries, Inc. v. Marathon Coach, Inc.; Defendant's Response to Plaintiff's Motion for Summary Judgment, Apr. 5, 2005.

Phase Four v. Marathon: Plaintiff Phase Four Industries, Inc.'s Opposition to Defendant's Motion for Summary Judgment w/ attached Exhibits 95-98); Apr. 5, 2005.

U.S. District Court (Oregon) Civil Docket, Case # 6:04-cv-06405-AA (Marathon Coach, Inc. v. Phase Four Industries, Inc. et al.); Feb. 9, 2007; 5 pages.

U.S. District Court (Northern District of California), Civil Docket, Case # 5:05-cv-11748-JW (Marathon Coach, Inc. v. Phase Four Industries, Inc. et al.); Feb. 9, 2007; 7 pages.

U.S. Dist. Court (ND-Cal) Civil Docket, Case #5:04-cv-04801-JW (Phase Four Industries, Inc. v. Marathon Coach, Inc.); Feb 9, 2007; 14 pages. [hereinafter #5:04-cv-04801-JW].

5:04-cv-04801-JW—Document 2-1 (Order Setting Initial Case Management Conference); Nov. 12, 2004; 4 pages.

5:04-cv-04801-JW—Document 2-2 (Standing Order re: Case Management); Nov. 12, 2004; 3 pages.

5:04-cv-04801-JW—Document 5 (Demand for Jury Trial); Dec. 3, 2004; 2 pages.

5:04-cv-04801-JW—Document 6 (Related Case Order); Dec. 21, 2004; 2 pages.

5:04-cv-04801-JW—Document 8-1 (Notice of Pendency of Other Action of Proceeding); Dec. 22, 2004; 2 pages.

5:04-cv-04801-JW—Document 8-2 (Ex. AA to Notice of Pendency); Dec. 22, 2004; 24 pages.

5:04-cv-04801-JW—Document 10 (Marathon's Motion to Stay w/ attachment); Dec. 30, 2004; 5 pages.

5:04-cv-04801-JW—Document 11 (Marathon's Proposed Order Granting Stay); Dec. 30, 2004; 2 pages.

5:04-cv-04801-JW—Document 12 (Pro Hac Vice Application of Julianne Davis); Jan. 10, 2005; 4 pages.

5:04-cv-04801-JW—Document 13 (Stipulated Request for Order Changing Time); Jan. 10, 2005; 2 pages.

5:04-cv-04801-JW—Document 14 (Declaration of David M. Zeff in Support of Request for Order Changing Time); Jan. 10, 2005; 3 pages.

5:04-cv-04801-JW—Documents 15-1 through 15-5 (Phase Four's Opposition to Motion to Stay with attachments); Jan. 15, 2005; 53 pages.

5:04-cv-04801-JW—Document 16 (Marathons' Opposition to Motion for Leave to File Amended Complaint . . . ); Jan. 17, 2005; 6 pages.

5:04-cv-04801-JW—Document 17 (Declaration of Stanley Pickett w/ attachments); Jan. 17, 2005; 4 pages.

5:04-cv-04801-JW—Document 18 (Declaration of David S. Fine w/ attachments); Jan. 17, 2005; 5 pages.

5:04-cv-04801-JW—Document 21 (Stipulation Selecting ADR Process); Feb. 22, 2005; 3 pages.

5:04-cv-04801-JW—Document 22 (Joint Rule 26(f) Plan . . . ); Mar. 7, 2005; 8 pages.

5:04-cv-04801-JW—Document 23 (Notice of Related Case); Mar. 7, 2005; 3 pages.

5:04-cv-04801-JW—Document 24 (Marathon's Administrative Motion to Consolidate Actions); Mar, 8, 2005; 13 pages.

5:04-cv-04801-JW—Document 25 (Legaard Declaration in Support of Administrative Motion); Mar. 15, 2005; 2 pages.

5:04-cv-04801-JW—Document 26 (Zeff Declaration in Support of Administrative Motion); Mar. 15, 2005; 4 pages.

5:04-cv-04801-JW—Document 27 (Order Denying Administrative Motion); Mar. 15, 2007; 2 pages.

5:04-cv-04801-JW—Document 28 (Order Following Case Management Conference); Mar. 15, 2005; 2 pages.

5:04-cv-04801-JW—Document 29 (Amended Order Following Case Management Conference); Mar. 15, 2005; 3 pages.

5:04-cv-04801-JW—Document 30 (Civil Minutes); Mar. 15, 2005; 1 page.

5:04-cv-04801-JW—Document 31 (Related Case Order); Mar. 23, 2005; 1 page.

5:04-cv-04801-JW—Documents 37-1 through 37-3 (Marathon's Motion for Partial Summary Judgment of Validity w/ attachments); Mar. 29, 2005; pp. 1-14.

5:04-cv-04801-JW—Document 38 (Exhibit 141—photocopy of published US 2004/0112432); Mar. 29, 2005; 54 pages.

5:04-cv-04801-JW—Document 39 (Christianson Declaration in Support of Marathon's Partial Summary Judgment Motion); Mar. 29, 2005; 3 pages.

5:04-cv-04801-JW—Documents 40-1 & 40-2 (Lacey Declaration in Support of Marathon's Partial Summary Judgment Motion w/ attachment); Mar. 29, 2005; 25 pages.

5:04-cv-04801-JW—Document 41 (White Declaration in Support of Marathon's Partial Summary Judgment Motion); Mar. 29, 2005; 2 pages.

5:04-cv-04801-JW—Documents 42-1 through 42-17 (Bryan Declaration w/ attachments); Mar. 29, 2005; 56 pages.

5:04-cv-04801-JW—Document 43 (Marathon's Proposed Order for Partial Summary Judgment); Mar. 29, 2005; 2 pages.

5:04-cv-04801-JW—Document 44 (Defendant's Response to Plaintiff's Motion for Summary Judgment); Apr. 5, 2005; 15 pages.

5:04-cv-04801-JW—Document 46 (Notice of Continuance); Apr. 12, 2005; 2 pages.

5:04-cv-04801-JW—Document 47 (Civil Minutes); Apr. 29, 2005; 1 page.

5:04-cv-04801-JW—Documents 48-1 & 48-2 (Swarts Declaration in Support of Phase Four's Motion for Summary Judgment); May 10, 2005; 54 pages.

5:04-cv-04801-JW—Documents 49-1 & 49-2 (Marathon's Notice of Motion / Motion for Leave to File First Amended Answer . . . (w/ attachment); Jun. 7, 2005; 11 pages.

5:04-cv-04801-JW—Document 50 (Legaard Declaration in Support of Motion for Leave . . . ); Jun. 7, 2005; 3 pages.

5:04-cv-04801-JW—Documents 51-1 through 51-4 (Phase Four's Opposition to Marathon's Motion for Leave to Amend); Jun. 27, 2005; 15 pages.

5:04-cv-04801-JW—Document 52 (Order Rescheduling Case Management Conference); Jun. 28, 2005; 2 pages.

5:04-cv-04801-JW—Document 53 (Marathon's Reply in Support of its Motion for Leave to Amend); Jul. 5, 2005; 2 pages.

5:04-cv-04801-JW—Document 54 (Order Granting Marathon's Motion for Leave . . . ); Jul. 19, 2005; 6 pages.

5:04-cv-04801-JW—Document 55 (Amended Order Granting Marathon's Motion for Leave . . . ); Jul. 19, 2005; 6 pages.

5:04-cv-04801-JW—Document 56 (Marathon's First Amended Answer & Counterclaims . . . w/ attachment); Jul. 21, 2005; 7 pages.

5:04-cv-04801-JW—Document 57 (Phase Four's Reply to First Amended Complaint . . . ); Jul. 29, 2005; 7 pages.

5:04-cv-04801-JW—Document 60 (Marathon's Objection to Amended Case Management Statement . . . ); Sep. 19, 2005; 3 pages.

5:04-cv-04801-JW—Documents 62-1 through 62-3 (Phase Four's Opposition to Marathon's Motion to Consolidate w/ attachment); Oct. 10, 2005; 10 pages.
5:04-cv-04801-JW—Document 64 (Marathon's Response to Phase Four's Motion to Compel Answers . . . ); Oct. 18, 2005; 6 pages.
5:04-cv-04801-JW—Document 65 (Order Granting Marathon's Partial Summary Judgment Dismissing Affirmative Defenses); Oct. 20,2005; 19 pages.
5:04-cv-04801-JW—Document 66 (Joint Rule 26(f) Plan; . . . )Oct. 24, 2005; 8 pages.
5:04-cv-04801-JW—Document 67 (Civil Minutes); Oct. 31, 2005; 1 page.
5:04-cv-04801-JW—Document 68 (Scheduling Order Patent Cases); Nov. 2, 2005; 4 pages.
5:04-cv-04801-JW—Document 69 (Scheduling Order); Nov. 3, 2005; 5 pages.
5:04-cv-04801-JW—Document 70-1 (Phase Four's Request for Clarification); Nov. 3, 2005; 4 pages.
5:04-cv-04801-JW—Document 71 (Notice of Withdrawal of Phase Four's Notice of Motion and Motion to Compel . . . ); Nov. 9, 2005; 1 page.
5:04-cv-04801-JW—Document 74 (Order Referring Case to Magistrate Judge Trumbull . . . ); Dec. 19, 2005; 3 pages.
5:04-cv-04801-JW—Document 75 (Marathon's Exchange of Preliminary Claim Constructions & Extrinsic Evidence); Jan. 23, 2006; 6 pages.
5:04-cv-04801-JW—Document 76 (Joint Claim Construction and Prehearing Statement); Jan. 27, 2006; 26 pages.
5:04-cv-04801-JW—Document 77 (Marathon's Ex.A—Photocopy of US patent No. 6,607,009); Jan. 27, 2006; 6 pages.
5:04-cv-04801-JW—Document 78 (Marathon's Ex. B—Merriam Webster Online Dictionary printouts); Jan. 27, 2006; 10 pages.
5:04-cv-04801-JW—Document 80 (Marathon's Ex. D—"A Short Tutorial on Patent Claim Construction"); Jan. 27, 2006; 3 pages.
5:04-cv-04801-JW—Document 81 (Marathon's Ex. E—Title Page and pp. 268-272 of Robert L. Harmon, "Patents and the Federal Circuit"); Jan. 27, 2006; 6 pages.
5:04-cv-04801-JW—Document 82 (Marathon's Ex. F—photocopy of Energizer Holdings, Inc. v. International Trade Commission opinion); Jan. 27, 2006; 4 pages.
5:04-cv-04801-JW—Document 83 (Ex. G—Photocopy of U.S. Appl. No. 6,607,009); Jan. 27, 2006; 6 pages.
5:04-cv-04801-JW—Document 84 (Phase Four Claim Construction Brief); Feb. 1, 2006; 37 pages.
5:04-cv-04801-JW—Document 85 (Phase Four's Misc. Administrative Request to File Oversize Brief); Feb. 1, 2006; 2 pages.
5:04-cv-04801-JW—Document 86 (Marathon's Claim Construction Brief); Feb. 2, 2006; 19 pages.
5:04-cv-04801-JW—Document 87 (Marathon's Amended Claim Construction Statement); Feb. 2, 2006; 9 pages.
5:04-cv-04801-JW: Document 88 (Civil Minutes); Feb. 22, 2006; 1 page.
5:04-cv-04801-JW: Document 89 (Notice of Settlement Conference . . . ); Mar. 30, 2006; 2 pages.
5:04-cv-04801-JW: Document 90 (Marathon's Motion to Compel Discovery w/ attachments); Apr. 18, 2006; 114 pages.
5:04-cv-04801-JW: Document 91 (Legaard Declaration w/ attachment); Apr. 18, 2006; 5 pages.
5:04-cv-04801-JW: Document 92 (Proposed Order); Apr. 12, 2006; 2 pages.
5:04-cv-04801-JW: Document 93 (Order Reassigning Matter for Settlement Conference); Apr. 26, 2006; 2 pages.
5:04-cv-04801-JW: Document 94 (Settlement Conference Order); Apr. 27, 2006; 4 pages.
5:04-cv-04801-JW: Document 95 (Phase Four's Oppositions to Motion to Compel w/ attachments); May 3, 2006; 27 pages.
5:04-cv-04801-JW: Document 97 (Order Rescheduling Settlement Conference); May 9, 2006; 3 pages.
5:04-cv-04801-JW: Document 98 (Order to Meet & Confer); May 15, 2006; 2 pages.
5:04-cv-04801-JW: Document 100 (Marathon's Reply to Motion to Compel); May 17, 2006; 7 pages.
5:04-cv-04801-JW: Document 101 (Marathon's Motion to Extend Deadline for Expert Witness Disclosure); May 17, 2006; 2 pages.
5:04-cv-04801-JW: Document 102 (Legaard Declaration in Support of Marathon's Motion to Extend Deadline . . . ; May 17, 2006; 3 pages.
5:04-cv-04801-JW: Document 103 (Proposed Order to Extend Deadline . . . ); May 17, 2006; 2 pages.
5:04-cv-04801-JW: Document 104 ( Civil Minute Order); May 23, 2006; 1 page.
5:04-cv-04801-JW: Document 105 (Order Granting Marathon's Motion to Extend Deadline . . . ); May 24, 2006; 3 pages.
5:04-cv-04801-JW: Document 106 (Order Denying Phase Four's Request for Clarification); May 24, 2006; 3 pages.
5:04-cv-04801-JW: Document 107 (Order Granting Marathon's Motion to Compel); May 24, 2006; 19 pages.
5:04-cv-04801-JW: Document 108 (Protective Order); May 24, 2006; 13 pages.
5:04-cv-04801-JW: Document 109 (Hotice of Appearance); Jul. 5, 2006; 2 pages.
5:04-cv-04801-JW: Document 110 (Order Granting Marathon's Motion to Consolidate Cases); Nov. 1, 2006; 5 pages.
5:04-cv-04801-JW: Document 111 (Civil Minute Order); Jul. 7, 2006; 1 page.
5:04-cv-04801-JW: Document 112 (Marathon's Motion to Extend Deadline for Expert Witness Disclosure); Aug. 15, 2006; 2 pages.
5:04-cv-04801-JW: Document 113 (Pitchford Declaration in Support of Marthon's Motion to Extend Deadline . . . ); Aug. 15, 2006; 2 pages.
5:04-cv-04801-JW: Document 114 (Proposed Order on Motion to Extend Deadline . . . ); Aug. 15, 2006; 2 pages.
5:04-cv-04801-JW: Document 115 (Order Granting Marathon's Motion to Extend Deadline . . . ); Aug. 22, 2006; 3 pages.
5:04-cv-04801-JW: Document 121 (Order Follwing Claims Construction Hearing: Setting Case Management Conference); Dec. 19, 2006; 14 pages.

* cited by examiner

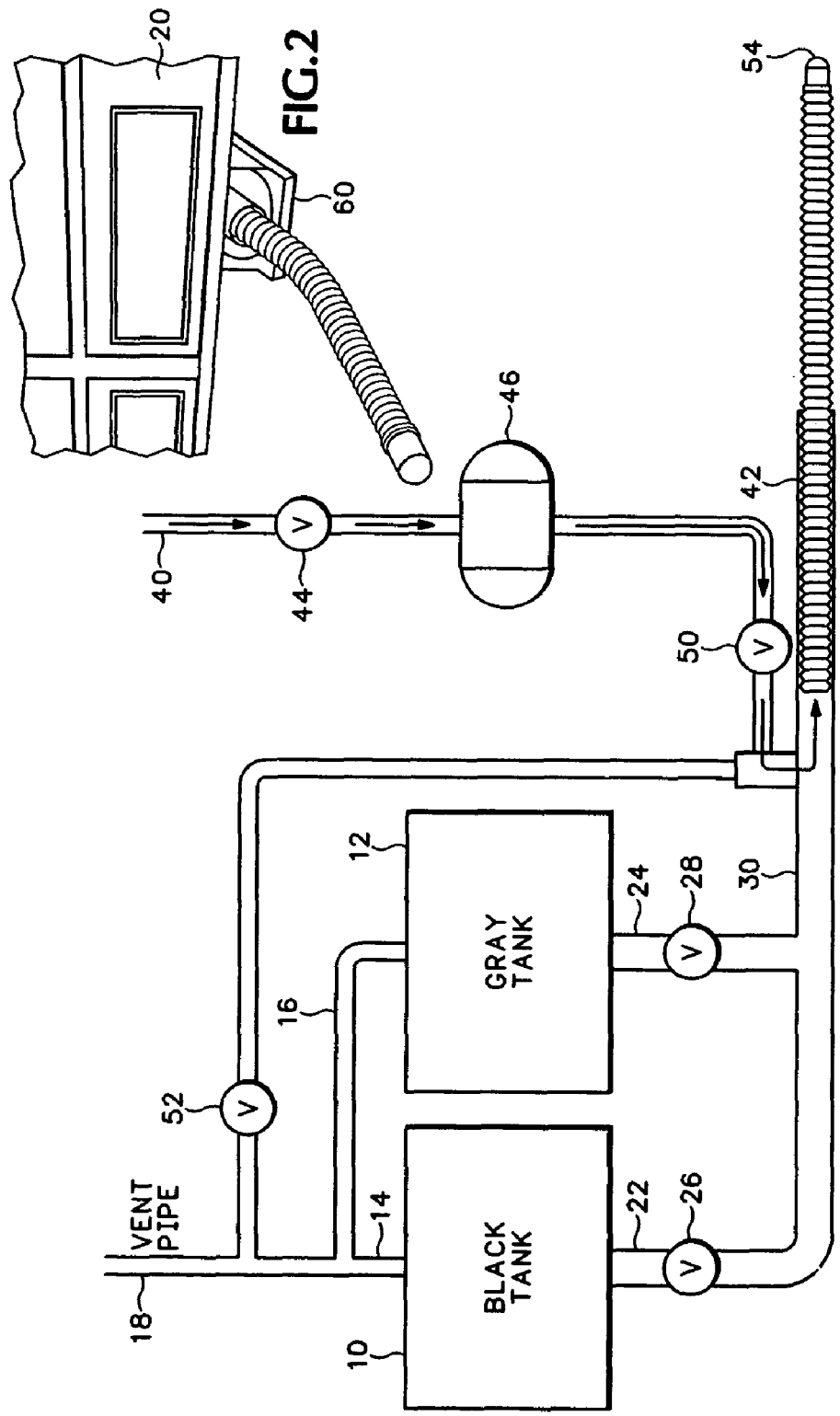

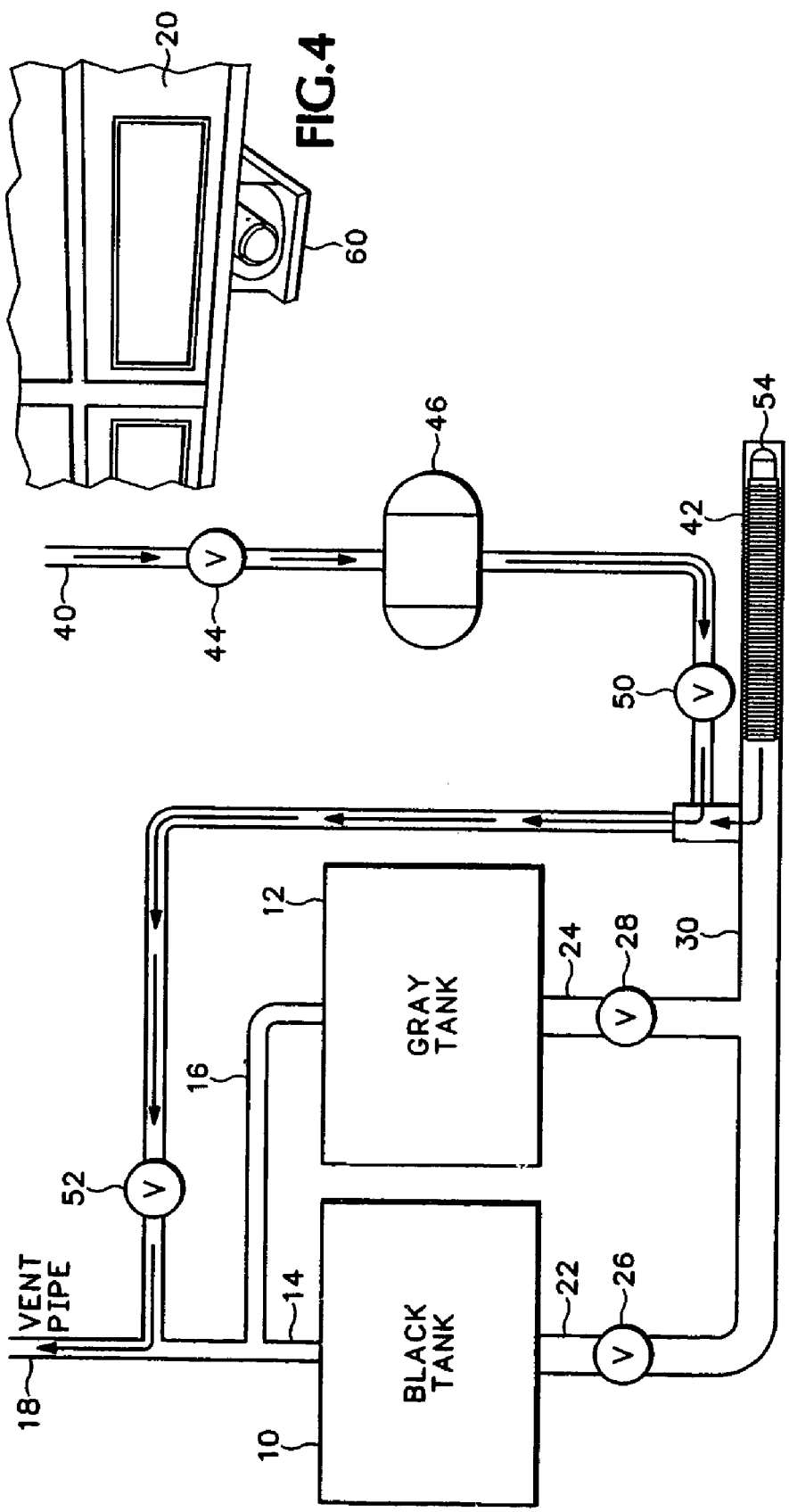

SEWAGE SYSTEM FOR VEHICLES

This application is a continuation of U.S. patent application Ser. No. 09/881,293, filed Jun. 13, 2001 now U.S. Pat. No. 6,607,009.

BACKGROUND OF THE INVENTION

The present invention relates to a sewage system for a vehicle.

Many types of vehicles, such as recreational vehicles, travel trailers, fifth wheelers, buses, trucks, and the like have self-contained fluid systems, sinks, washing facilities and/or bathrooms. Each of these vehicles and others will be collectively referred to herein as "recreational vehicles" or "RVs". Such RVs include systems which store sewage and waste water until those materials can be properly disposed of. Typically, RVs generally utilize similar means of conducting waste to external storage tanks, dumps, or processing systems, such as those which are used in RV parks, truck stops, bus stops, and the like. Conventional RVs generally have two holding tanks, a sewage tanks (e.g., black tank) for receiving fluid sewage from the toilet system, and a grey water tank for receiving waste water, such as from the kitchen, bathroom sinks, and shower. These two holding tanks are interconnected to form a single liquid conduit drain line or drain pipe. RVs generally have an accessible external cabinet or storage facility which stores a length of flexible sewage discharge hose or other conduit. This discharge hose or other conduit may be manually connected to a fitting on the outlet stub of the drain pipe. The other end of the hose or other conduit is then extended to a dump fitting. Similarly, when the RV is preparing to move on, it is also necessary to handle the hose or other conduit, and flush the waste from it before storing it. These processes, i.e., dumping the waste from the holding tank into the inlet receptacle of the RV dump station and disconnecting and storing the hose or other conduit, are the messiest and most dreaded aspects of using an RV.

Besides the mess of dealing with the liquid waste problem, the predominate problem with the traditional sewage hose or other conduit system, is that the RV user must get on his or her knees and reach beneath the RV to attach the sewage hose or other conduit to the outlet pipe of the conduit beneath the RV. Consequently, there have been numerous devices which have been developed to increase the ease and/or reduce the clumsiness of attaching and detaching RV sewage hoses or other conduits. Many of such systems include flexible discharge hoses that are stored in a conduit extension member beneath the RV, and are telescopically moved therefrom when it is desired to secure the hose to a dump site. While these systems have their merits, these devices are stored permanently beneath the RV, and they still generally require the RV user to get on his or her knees to reach beneath the RV to access the sewage hose.

Mercer, U.S. Pat. No. 5,023,959, discloses a system for extending and retracting the waste hose for a waste disposal system that is typically found on recreational vehicles. The disposal system includes a power driven hose extender for extending the collapsible hose from its collapsed mode stored on-board the recreational vehicle to its extended configuration which it is used for dumping waste from an RV holding tank into an inlet of an RV waste dump station. In particular, a hose driver is used to axially displace threaded shafts, wherein an external collar engages around the accordion hose, which has a continuous helical rib.

Mercer, U.S. Pat. No. 4,133,347, discloses a waste evacuation attachment for a recreational vehicle that includes a rigid cylindrical housing readily mountable to the existing fitting of a sewage discharge outlet of the recreational vehicle. A telescoping hose is contained within the housing and has a fitting on the extendable end to adapt the hose to waste receiving receptacles. The extension and retraction of the hose is by extending and retracting the hose within the housing. Foreman, U.S. Pat. No., 4,854,349, likewise discloses telescoping hose contained within a housing.

Hanemaayer, U.S. Pat. No. 5,653,262, discloses an axially extendable flexible hose connected to a waste outlet of a tank. An elongated tubular housing is provided within which the flexible hose extends such that the hose can be stored in the housing and also drawn outwardly of the distal end of the housing toward a waste receptacle. The housing has an articulated connection at a proximate end thereof adjacent the waste outlet. The extension and retraction of the hose is by extending and retracting the articulated hose within the housing.

Cook, U.S. Pat. No. 4,223,702, discloses a telescoping drain line for connecting recreational vehicles to a sewage system. The flexible hose extends through the telescoping pipe sections.

Feliz, U.S. Pat. No. 3,811,462; Boomgaarden, U.S. Pat. No. 5,244,003; Leech, U.S. Pat. No. 5,904,183; and Sargent et al., U.S. Pat. No. 4,779,650, likewise disclose telescoping tubular arrangements.

While many of the aforementioned systems provide telescoping tubular arrangements, they still require a substantial amount of effort on the part of the user to discharge the sewage.

BRIEF DESCRIPTION OF THE DRAWINGS

FIG. 1 is an exemplary schematic of a sewage system for a vehicle for extending a waste hose.

FIG. 2 is a side view of a portion of the vehicle of FIG. 1 showing the waste hose in the extended position.

FIG. 3 is an exemplary schematic of the sewage system for the vehicle of FIG. 1 for retracting the waste hose.

FIG. 4 is a side view of a portion of the vehicle of FIG. 3 showing the waste hose in the retracted position.

DETAILED DESCRIPTION OF THE PREFERRED EMBODIMENT

Referring to FIG. 1, an exemplary waste system for a RV of the present invention may include a black tank 10 for holding toilet sewage and a grey tank 12 for holding other waste water, such as for example, the sink or the shower. The black tank 10 and the grey tank 12 may be replaced by a single storage container, if desired. The black tank 10 and the grey tank 12 are interconnected by pipes 14 and 16 to a vent pipe 18. The vent pipe 18 is preferably vented to the exterior of the recreational vehicle 20 (see FIG. 2) which provides for air flow into and out of the waste system. The black tank 10 may be drained through a drain pipe 22 when a black waste valve 26 is opened. Conversely, when the black waste valve 26 is closed the waste in the black tank 10 is not drained. Similarly, the grey tank 12 may be drained through a drain pipe 24 when a grey waste valve 28 is opened. Conversely, when the grey waste valve 28 is closed the waste in the grey tank 12 is not drained. The waste from the grey tank 12 and black tank 10 are preferably joined into a single drain pipe 30 for eventual discharge from the RV into a suitable receptacle. Multiple drain pipes for discharge of materials from the RV may be used, if desired.

After consideration of the typical recreational vehicle, the present inventors came to the realization that many recreational vehicles include an internal compressor which provides pressurized air (or other gas) that may be used by the waste system. The waste system may use the pressurized air to provide automatic extension and retraction of the waste hose 42. Using an existing pressurized air source reduces the expense of an automated extension and retraction of the waste hose 42. The automatic extension alleviates the need for the user to bend down under the RV or otherwise manually extend and retract the waste hose 42. The waste system preferably includes an intake 40 that provides air pressure from the recreational vehicle 20. The air pressure within the intake may be provided from the recreational vehicle 20 powered when the engine is running or otherwise a compressor within the recreational vehicle 20. An intake check valve 44 is preferably a "one-way" valve that substantially only permits air flow in a single direction, as indicated by the arrows. In this manner, the air flow will not flow back to the pressurized air source. An air tank 46 is preferably included that stores additional compressed air, such as a 7 gallon tank, so that sufficient air pressure is obtained without having to increase the capacity of the air compressor. It is to be understood that valve, as used herein, refers to any mechanism that is suitable to control the flow, stop the flow, restrict the flow or otherwise, of materials through a tubular member.

When the user desires to extend the waste hose 42, a check valve 50 is opened which permits air pressure to flow through the check valve 50 and into the drain pipe 30. A vent check valve 52 is preferably closed to primarily restrict the air flow through the drain pipe 30. Likewise, preferably the black waste valve 26 and the grey waste valve 28 are closed. Accordingly, substantially all the air flow will be acting upon the waste hose 42 which is preferably slidably engaged with the waste system. More preferably the waste hose 42 (or a majority thereof) is freely slidably engaged with the waste system over a majority of its extension. Moreover, the waste hose 42 may rotatably extend or move based upon other mechanisms in such a manner as to extend from the vehicle. The pressure exerted on the end portion of the waste hose 42, capped by a detachably engageable cover 54, will cause the waste hose 42 to slide outwardly from the recreational vehicle 20, as illustrated in FIG. 2. In this manner, by simply opening the valve 50 the waste hose 42 may be slidably extended in a manner that is free from the user having to manually pull or otherwise extend the waste hose. After extending the waste hose 42 the cover 54 is removed and the waste hose 42 is interconnected with the suitable waste receptacle. Other air pressure techniques may likewise be used to extend the waste hose 42, such as for example, air pressure against the interior end 54 of the waste hose 42 as opposed to air pressure against the cover 54, an air pressure operated rotational mechanism that extends/retracts the waste hose 42, and a hydraulics based pressure extension/retraction mechanism. Moreover, if desired the air pressure mechanism may be replaced by an electrical extension/retraction system or other type of extension/retraction system that automatically extends and/or retracts the waste hose 42. Thereafter the black tank and/or the grey tank may be emptied into the receptacle by selectively opening the black waste valve 26 and/or the grey waste valve 28, respectively. The waste hose 42 may be, for example, articulated, non-articulated, extendable lengthwise, non-extendable lengthwise, substantially non-compressible, and/or substantially compressible. Further, the waste hose 42 may be any type of tubular member having any cross sectional profile(s) suitable to pass liquids through.

For example, the waste system may be used to extend the waste hose 42 as follows. Initially a button, a lever, or other user initiation of the waste system is performed. The vent check valve 52 is closed if not already closed, the black waste valve 26 is closed if not already closed, the grey waste valve 28 is closed if not already closed, and the check valve 50 is opened if not already opened. The air from the air intake 40 and/or air from the air tank 46 provides air pressure against the waste hose 42 (or other mechanism) which causes the waste hose 42 to slidably extend outwardly from the vehicle 20. The user then removes the cover 54 and engages the waste hose 42 with the receptacle.

Referring to FIG. 3, the waste system may retract the waste hose 42 as follows. The user disengages the waste hose 42 from the receptacle and replaces the cover 54. The user then presses a button, a lever, or other user initiation of the waste system if performed. The vent check valve 52 is opened if not already opened, the black waste valve 26 is closed if not already closed, the grey waste valve 28 is closed if not already closed, and the check valve 50 is opened if not already opened. The air from the air intake 40 and/or air from the air tank 46 provides air pressure that passes through the vent check valve 52 which creates a vacuum within the waste hose 42 which causes the waste hose 42 to retract inwardly toward the vehicle 20, as illustrated in FIG. 4. After completing usage of the waste system, the vent check valve 52, the check valve 50, the black waste valve 26, and/or the grey waste valve 28 are preferably closed.

After further consideration, the present inventors determined that having a stationary opening under the recreational vehicle 20 for the waste hose 42 permits the waste hose 42 to be inadvertently damaged while traveling. Moreover, having a manually removable cover for the stationary opening, while advantageous, still requires the user to manually remove the cover. Referring to FIGS. 2 and 4, preferably the waste hose 42 is supported by a movable support 60. In a closed position, the support 60 rotates, raises, or otherwise moves such that the waste hose 42 is not free to extend. Also, the support 60 moves the end of the waste hose 42 to a position that is protected from the exterior elements when not in use. Moreover, preferably upon moving the support 60 to an opened position, the end of the hose is directed at an acute angular relationship, such as for example 10-45 degrees, with respect to the ground. This angular relationship assists in directing the waste hose 42 across the ground in a manner that facilitates extension of the waste hose 42.

All references discussed herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A liquid materials handling system for liquid waste materials for a vehicle comprising:
    (a) a storage container situated in the vehicle for fluid waste materials;
    (b) an elongate tubular member through which said waste materials may flow coupled to the storage container; and
    (c) a pressurized air system coupled to the elongate tubular member for supplying air under pressure into the elongate tubular member thereby extending the elongate tubular member away from the vehicle and for removing air from the elongate tubular member thereby retracting the elongate tubular member toward the vehicle.

2. The liquid materials handling system of claim 1 wherein said pressurized air system includes an air tank.

3. The system of claim 2 further comprising a first check valve interconnected to the output of said air tank and a second check valve interconnected to the input of said air tank.

4. The liquid materials handling system of claim 2 wherein said pressurized fluid system uses air as a fluid.

5. A liquid materials handling system for liquid waste materials for a vehicle comprising:
   (a) a storage container situated in the vehicle for liquid waste materials;
   (b) an elongate tubular member through which said waste materials may flow coupled to the storage container; and
   (c) a pressurized fluid system coupled to the elongate tubular member for extending the elongate tubular member away from the vehicle and for retracting the elongate tubular member toward the vehicle, wherein said elongate tubular member includes an end cap and said pressurized fluid system is coupled internally to the elongate tubular member so as to exert positive fluid pressure on said end cap when extending the elongate tubular member away from the vehicle and for exerting negative fluid pressure on said end cap when retracting the elongate tubular member toward the vehicle.

* * * * *